W. SCHWARZ.
GAS PURIFYING APPARATUS.
APPLICATION FILED OCT. 16, 1912.

1,076,458.

Patented Oct. 21, 1913.

2 SHEETS—SHEET 1.

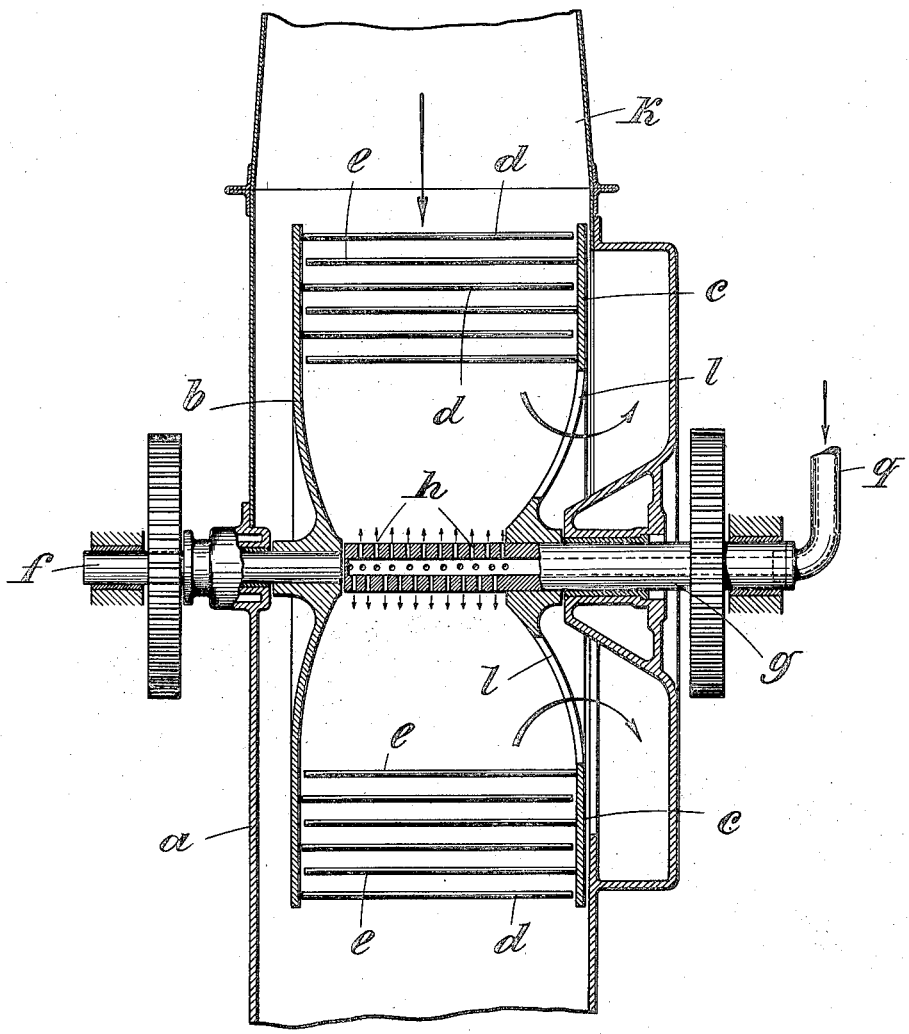

UNITED STATES PATENT OFFICE.

WALTER SCHWARZ, OF DORTMUND, GERMANY.

GAS-PURIFYING APPARATUS.

1,076,458.

Specification of Letters Patent.

Patented Oct. 21, 1913.

Application filed October 16, 1912. Serial No. 726,123.

*To all whom it may concern:*

Be it known that I, WALTER SCHWARZ, of Dortmund, Germany, a subject of the King of Prussia, and whose post-office address is 72 Friedenstrasse, Dortmund, Kingdom of Prussia, German Empire, have invented new and useful Improvements in and Relating to Gas-Purifying Apparatus, of which the following is a specification.

The present invention relates to an apparatus for purifying gases, in which by centrifuging in drums or the like, gas and a liquid, for instance water are brought into close contact with each other. During this process, the specifically heavier impurities of the gas, which will become still heavier by the adhering water, will be separated by the centrifugal forces produced by the rotation. A great difficulty which was hitherto experienced with apparatus of this kind consisted in the surfaces coming in contact with the gas, for instance the vanes and the like became thickly incrustated with the admixtures, and the service of the apparatus was thereby greatly impaired.

The apparatus according to the present invention consists of a rotor composed of beaters or bars, several such rotors being arranged in a casing in such a manner, that each circle of beaters is followed by a circle of beaters revolving in the opposite sense, in such a manner, that the several circles of beaters are arranged within each other and each circle is of a smaller diameter than the preceding one. By such arrangement a revolving body is obtained, which is composed of any desirable number of beater circles, the number of these depending upon the quality of the gases and the degree of purity which it is desirable to obtain.

Figure 1:
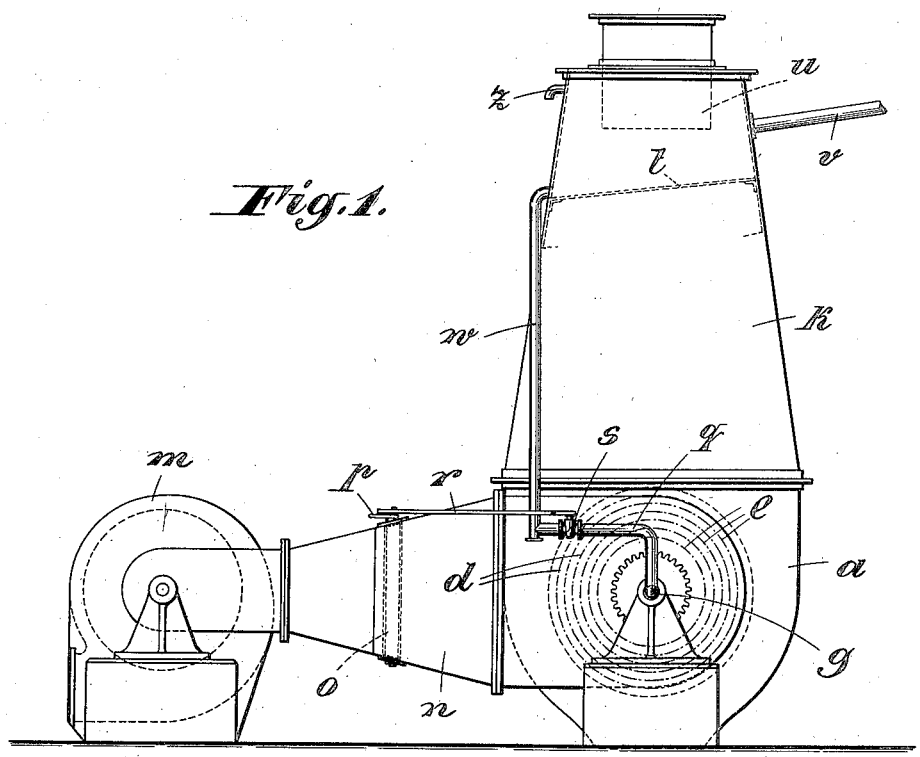
Figure 2:
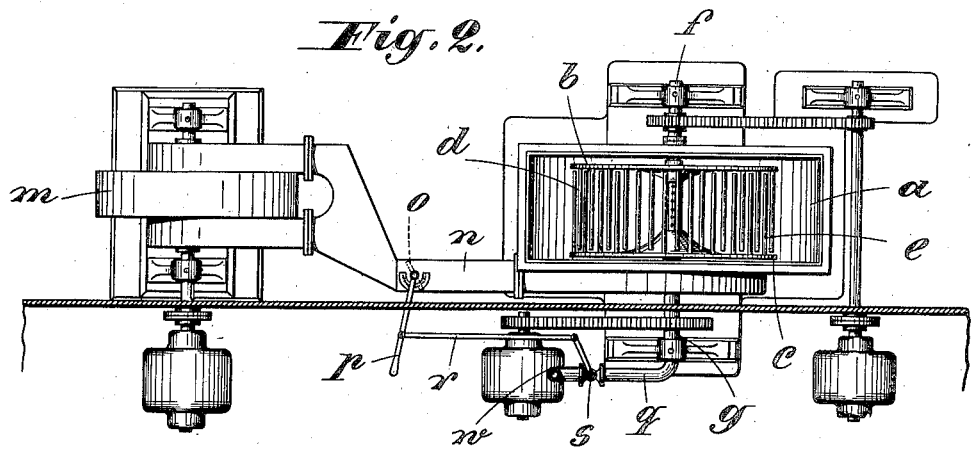

In the accompanying drawing the invention is exemplified in a constructional form shown in Figures 1 to 3. In these Fig. 1 is a side elevation of the apparatus, while Fig. 2 is a plan of the same; Fig. 3 is a section through the casing showing the rotor, drawn on an enlarged scale.

The apparatus consists essentially of a gas purifying chamber $a$, through which the gas to be purified flows from the circumference toward the center. Within this chamber is arranged the rotor, which is composed of two opposite driven disk-wheels $b$, $c$ (Fig. 3), in which are secured beaters or bars arranged in circles. For the purpose of securing these beaters, the latter are preferably tapered at one end and riveted in the correspondingly tapered bore in the disk-wheel. By such means circles of beaters are produced which fit the one over the other. Proceeding from outside toward the center each row of beaters has a smaller diameter than the preceding one.

For the disk-wheels to revolve in opposite directions the one of them, $b$ is fitted to a solid shaft $f$, while the other disk-wheel is fitted to a hollow shaft $g$, the said shafts being passed through opposite walls of the gas chamber $a$. The disk-wheels $b$, $c$ are arranged at a distance from each other, which is somewhat larger than the length of the beaters $d$, $e$ so that the alternating circles of beaters will fill up the space between the said disk-wheels. By suitable driving means the one shaft is revolved in the one, the other in the opposite direction, so that the circles of beaters revolve in opposite directions. The liquid required for purifying the gases is injected into the chamber through the said hollow shaft $g$ which is suitably arranged as an injection pipe. For this purpose it is provided with a plurality of orifices $h$, through which the liquid is injected into the revolving cage of beaters. Above this cage is arranged a mixing chamber $k$, Figs. 1 and 3, in which the gas entering in the direction indicated by the arrow in Fig. 3 will be saturated with the liquid diffused by the revolving cage of beaters. The gas passes through the circles of beaters $d$ and $e$ whereupon it will escape through apertures $l$ in the disk-wheels in the direction of the arrow in Fig. 3. For sucking the gas through the apparatus a suction fan $m$, Fig. 1, is employed which communicates by means of a chamber or a flue $n$ or the like with the said apertures in the disk-wheels. The gas is sucked by the fan and then forced to the place of consumption. Any moisture still contained in the gas will be separated by the centrifuging action of the fan.

Owing to the fact, that the two media, the gas and the water flow in opposite directions, they are brought into a close contact with each other. As it will be of importance to accurately control the velocity of the passage, a throttling valve $o$ is preferably arranged in the communicating chamber $n$, between the escape apertures in the disk-wheels and the entrance into the fan $m$. This throttling valve is operated by a lever $p$, extending through the apparatus and operatable from outside, Fig. 2, a scale being provided according to which the area to which the passage is set may be controlled. The said lever *p* may be positively coupled with a valve in the supply pipe *q*, Figs. 2 and 3, so that when the throttle valve is closed also the water supply will be cut off. In the constructional form shown the lever *p* is positively coupled to the valve *s* by means of a link *r*. By such arrangement the ratio between the gas and water will be always kept constant, as this is of great importance for a proper purification.

When the throttle valve *o* is completely closed also the water supply will be entirely cut off, but the entrance of the gas into the apparatus will not have been prevented. Therefore the entrance or mixing chamber *k* is so arranged, that when the water is cut off, also the gas supply will be shut off. With this object a trough *t* or the like is provided in the said entrance chamber, into which trough the gas admission tube *u* projects. The injection water is conducted through a suitably disposed pipe *v* first into this trough. The water flows through this trough and emerges at the lowest point of the same, whence it is conducted by another pipe *w* to the pipe *q* leading into the hollow shaft. When now the valve *s*, which is positively coupled to the throttling valve *o*, is closed, the discharge of the water from the trough will be closed, and the water will rise in the latter until the tube *u* is so deeply submerged that the gas supply is likewise cut off. An overflow siphon *z* provided at a suitable level will show by the water running from it in a reliable manner that the gas supply is shut off. By the hereinbefore described arrangement the apparatus will automatically seal itself against any further entrance of gas, so that after the apparatus has been stopped, the same may be inspected and repairs may be executed without any danger. In view of the highly poisonous character of the gases, in particular of the danger inherent in furnace gases, the safety in working with the apparatus according to the present invention is greatly increased. Owing to the said dangerous character of the gases it is desirable to arrange apparatus of this kind in the open air. This, however, entails the great disadvantage that the engines for driving the fan and the disk-wheels revolving in opposite directions are not sufficiently protected.

Therefore preferably an arrangement will be employed, in which the engine producing the opposite rotation, for instance for the hollow shaft, drives a countershaft arranged outside of the premises, from which countershaft then the shaft of the one side of the cage is driven by gearing, chains or the like. The driving engine is then placed on the same side as the other engines, so that notwithstanding the opposite sense of the rotation, the engines to be protected are all on one side, and may be easily covered by a suitable superstructure or the like.

What I do claim as my invention, and desire to secure by Letters Patent of the United States, is:

1. In a gas purifying apparatus the combination of a gas purifying chamber into which the gas flows from the circumference toward the center, a revoluble cage of beaters closely inclosed by the casing, the beaters in said cage arranged in circles revolving alternately in opposite directions, the number of said circles depending upon the degree of purification to be obtained, a gas chamber behind said beater cage, a throttle valve in said gas chamber and a fan behind said gas chamber another valve in the water supply pipe, said valve coupled to the said throttle valve in the gas chamber and adapted to maintain a constant ratio between the gas volume and the quantity of water injected, substantially as described.

2. In a gas purifying apparatus the combination of a gas purifying chamber into which the gas flows from the circumference toward the center, a revoluble cage of beaters closely inclosed by the casing, the beaters in said cage arranged in circles revolving alternately in opposite directions, a gas chamber behind said beater cage, a throttle valve in said gas chamber and a fan behind said gas chamber, a mixing chamber containing a trough into which the gas supply pipe projects and means for producing a water seal of said gas pipe in said trough when the water injection is shut off, substantially as described.

In testimony whereof, I have hereunto set my hand in presence of two subscribing witnesses.

WALTER SCHWARZ. [L. S.]

Witnesses:
 WILHELM SOMMERS,
 ALBERT NUFER.